(12) United States Patent
Hislop et al.

(10) Patent No.: US 12,067,295 B2
(45) Date of Patent: Aug. 20, 2024

(54) MULTIPLE PROTOCOL ARRAY CONTROL DEVICE SUPPORT IN STORAGE SYSTEM MANAGEMENT

(71) Applicant: Dell Products, L.P., Hopkinton, MA (US)

(72) Inventors: Nigel Hislop, Springfield, VA (US); Xuedong Jiang, Andover, MA (US); Paul Bradley, Macroom (IE)

(73) Assignee: Dell Products, L.P., Hopkinton, MA (US)

( * ) Notice: Subject to any disclaimer, the term of this patent is extended or adjusted under 35 U.S.C. 154(b) by 137 days.

(21) Appl. No.: 17/857,237

(22) Filed: Jul. 5, 2022

(65) Prior Publication Data

US 2024/0012577 A1     Jan. 11, 2024

(51) Int. Cl.
*G06F 3/06* (2006.01)

(52) U.S. Cl.
CPC .......... *G06F 3/0659* (2013.01); *G06F 3/0604* (2013.01); *G06F 3/067* (2013.01)

(58) Field of Classification Search
CPC .... G06F 3/0614; G06F 3/0659; G06F 3/0673; G11C 2207/005; G11C 7/18; G11C 11/4094; G11C 11/4096; G11C 11/4097; G11C 11/4091
See application file for complete search history.

(56) References Cited

U.S. PATENT DOCUMENTS

2015/0293699 A1* 10/2015 Bromley ............... G06F 3/0629
711/161
2018/0074717 A1* 3/2018 Olarig .................. G06F 3/0689
2020/0319812 A1* 10/2020 He ........................ G06F 3/0629

OTHER PUBLICATIONS

NVM Express® Specifications Overview, unknown publication date, (4 pages).
NVM Express® Base Specification, Revision 2.0b, Jan. 6, 2022 (455 pages).
NVM Express® Management Interface Specification, Revision 1.0b, Jan. 10, 2022 (163 pages), see e.g. Figs. 45 and 46.
NVM Express® TCP Transport Specification, Revision 1.0b, Jan. 6, 2022 (35 pages).

(Continued)

*Primary Examiner* — Jason W Blust
(74) *Attorney, Agent, or Firm* — Anderson Gorecki LLP

(57) ABSTRACT

Management applications (hosts) implement management operations on a storage system by passing system calls (syscalls) to a management system. In some embodiments, all management traffic is passed from one or more instances of a management application to a management daemon executing in the context of the storage system operating system. The management daemon sorts syscalls received from the management applications and implements the syscalls using one or more array control devices. The array control devices are special target devices configured on external control hosts for sending management commands to the storage system operating system and receiving information from the storage system. In some embodiments, Non-Volatile Memory express (NVMe) devices to be used as array control devices, and enable TCP connections to be used as logical array control devices. Adding multiple protocol support in the existing management software infrastructure enables users to seamlessly migrate to the new data center technologies.

20 Claims, 11 Drawing Sheets

(56) References Cited

OTHER PUBLICATIONS

Internet Engineering Task Force Request for Comments 675, Specification of Internet Transmission Control Program, Dec. 1974 (70 pages).
Internet Engineering Task Force Request for Comments 791, Internet Protocol, DARPA Internet Program Protocol Specification, Sep. 1981 (96 pages).
Internet Engineering Task Force Request for Comments 2460, Internet Protocol, Version 6 (IPv6) Specification, Dec. 1998 (39 pages).
SCSI Standards Architecture, unknown publication date (1 page).

* cited by examiner

FIG. 8

| Field | Length (bits) | Description |
|---|---|---|
| ID String | 64 | A string to identify the client |
| Software Revision | 32 | A number to identify the software version of the client |
| Payload Size | 32 | A number to indicate the payload size |
| Checksum | 32 | A hash value generated for the header |
| Status | 32 | A number to identify the status of the syscall |
| Function | 8 | A number to identify the type of the message |
| Name | 800 | A string for the device |

FIG. 11

| Field | Length (bits) | Description |
|---|---|---|
| OPCODE | 8 | NVMe operation code |
| Flags | 8 | Flags |
| NSID | 32 | Namespace ID |
| IO BUF | 64 | Payload address |
| IO Length | 32 | Payload length |
| CDW 2 | 32 | For future use |
| CDW 3 | 32 | For future use |
| CDW 10 | 32 | IO length |
| CDW 11 | 32 | For future use |
| CDW 12 | 32 | Sequence code |
| CDW 13 | 32 | For future use |
| CDW 14 | 32 | For future use |
| CDW 15 | 32 | For future use |
| Timeout | 32 | Timeout indicator |
| Result | 32 | Error code |

MULTIPLE PROTOCOL ARRAY CONTROL DEVICE SUPPORT IN STORAGE SYSTEM MANAGEMENT

FIELD

This disclosure relates to computing systems and related devices and methods, and, more particularly, to a method and apparatus for enabling storage management hosts to use multiple types of array control devices for syscalls in a storage management system.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

Management applications (hosts) implement management operations on a storage system by passing system calls (syscalls) to a management system. In some embodiments, all management traffic is passed from one or more instances of a management application to a management daemon executing in the context of the storage system operating system. The management daemon sorts syscalls received from the management applications and implements the syscalls using one or more array control devices. The array control devices are special target devices configured on external control hosts for sending management commands to the storage system operating system and receiving information from the storage system.

According to some embodiments, a system and method are provided that enable Non-Volatile Memory express (NVMe) devices to be used as array control devices, and enable TCP connections to be used as logical array control devices. Adding multiple protocol support in the existing management software infrastructure enables users to seamlessly migrate to the new data center technologies.

BRIEF DESCRIPTION OF THE DRAWINGS

FIG. 8 is a table showing the name, length, and meaning of each field in the example TCP array control device header of FIG. 7, according to some embodiments.

FIG. 11 is a table showing the name, length, and meaning of each field in the example NVMe array control device header of FIG. 10, according to some embodiments.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
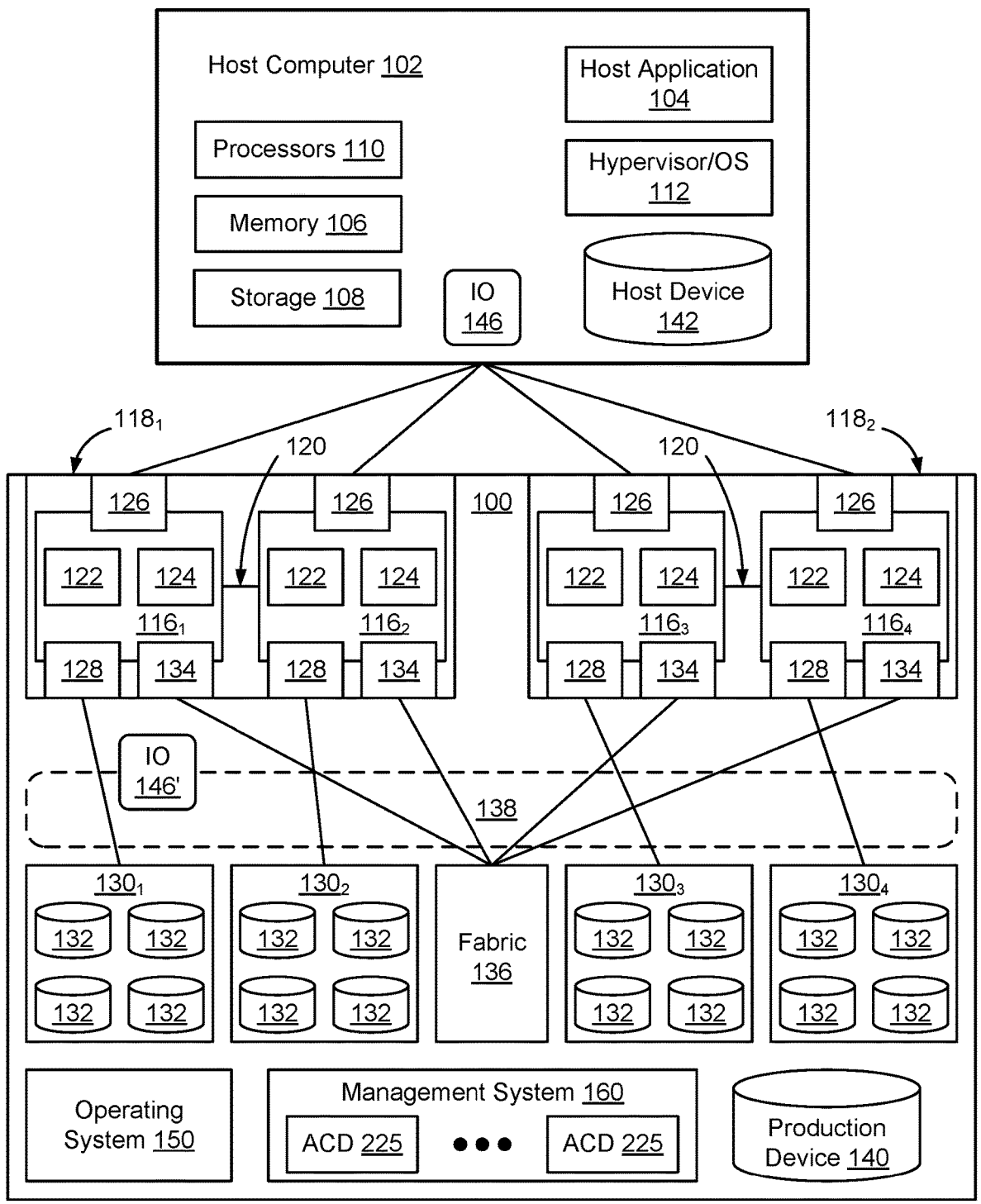
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System)

112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g. in the virtual shared global memory 138 or on managed drives 132. If the commanded data is not in the virtual shared global memory 138, then the data is temporarily copied into the virtual shared global memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132.

Figure 2:
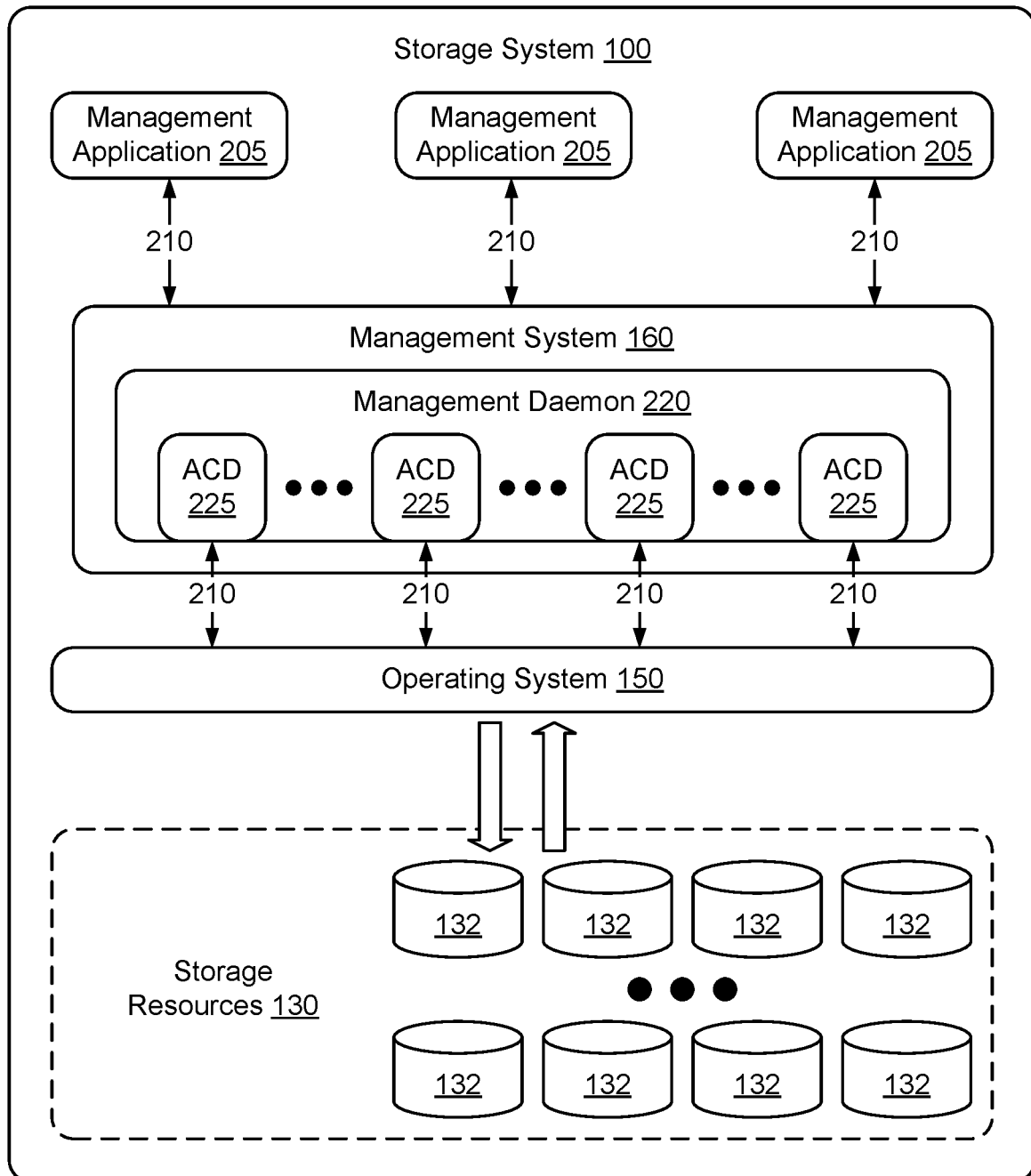
FIG. 2 is a functional block diagram of an example storage system showing aspects of the management processes in greater detail, according to some embodiments.

FIG. 2 is a functional block diagram of an example storage system showing aspects of the management processes in greater detail, according to some embodiments. As shown in FIG. 2, in some embodiments management applications 205 generate syscalls 210 that are sent to management system 160 to implement management operations on the storage system 100 to configure operation of the storage system 100.

In some embodiments, syscalls 210 generated by the management applications 205 are passed to a management daemon 220 implemented as part of the management system 160. A "daemon" as that term is used herein, is used to refer to a background process operating in the context of the storage system operating system 150 that is not under the direct control of an interactive user. In a Unix environment, the parent process of a daemon is often, but not always, the init process. Although the description will refer to the background process used by management system 160 as a "daemon" other background processes may be used as well, such as Windows Services, depending on the implementation.

In some embodiments, the management daemon 220 manages communication between a control host (management application 205) and the storage system arrays. Syscalls from the management applications 205 are forwarded to management daemon 220 where they are processed and sent out to target arrays. Once syscall results are returned from the array, the management daemon 220 sends the results to syscall callers. In addition to managing all syscalls 210, the management daemon 220 is also responsible for discovering the reachability and topology of the arrays.

In some embodiments, the management daemon 220 receives syscalls 210 from the management applications 205 and implements the syscalls using one or more array control devices 225. Array Control Devices (ACDs) are operating system devices. An array control device may be implemented, for example, as a Small Computer System Interface (SCSI) device that is created by the operating system and mapped and masked to the host process. The array control devices are special target devices configured on external control hosts for sending management commands to the storage system operating system 150 and receiving information from the storage system. For example, in some embodiments the management daemon issues write operations on the array control devices, which are received by the operating system 150. By using array control devices 225, it is possible to encapsulate management traffic e.g., in SCSI commands, and then transmit the management traffic in-band over SCSI links between the host and storage system. Using array control devices thus enables the management traffic to re-use the software infrastructure developed for SCSI IOs, to thus avoid the development of a separate software stack for management traffic.

According to some embodiments, a system and method are provided that support transport protocols in addition to SCSI for submission of syscalls in a storage management system. In some embodiments, the transport protocol is Non-Volatile Memory express (NVMe), which enables the management system to submit syscalls via NVMe array control devices using NVMe administrative commands, to replace pre-existing SCSI protocol in their data center. In some embodiments, syscalls are able to be transmitted by the management system to the array control devices using a TCP/IP connection that is configured to act as a logical array control device, to simplify their configuration and management of storage systems. Adding multiple protocol support in the existing management software infrastructure enables users to seamlessly migrate to the new data center technologies.

According to some embodiments, a system and method are provided that enable Non-Volatile Memory express (NVMe) devices to be used as array control devices, and enable TCP connections to be used as logical array control devices. Adding multiple protocol support in the existing management software infrastructure enables users to seamlessly migrate to the new data center technologies.

Figure 3:
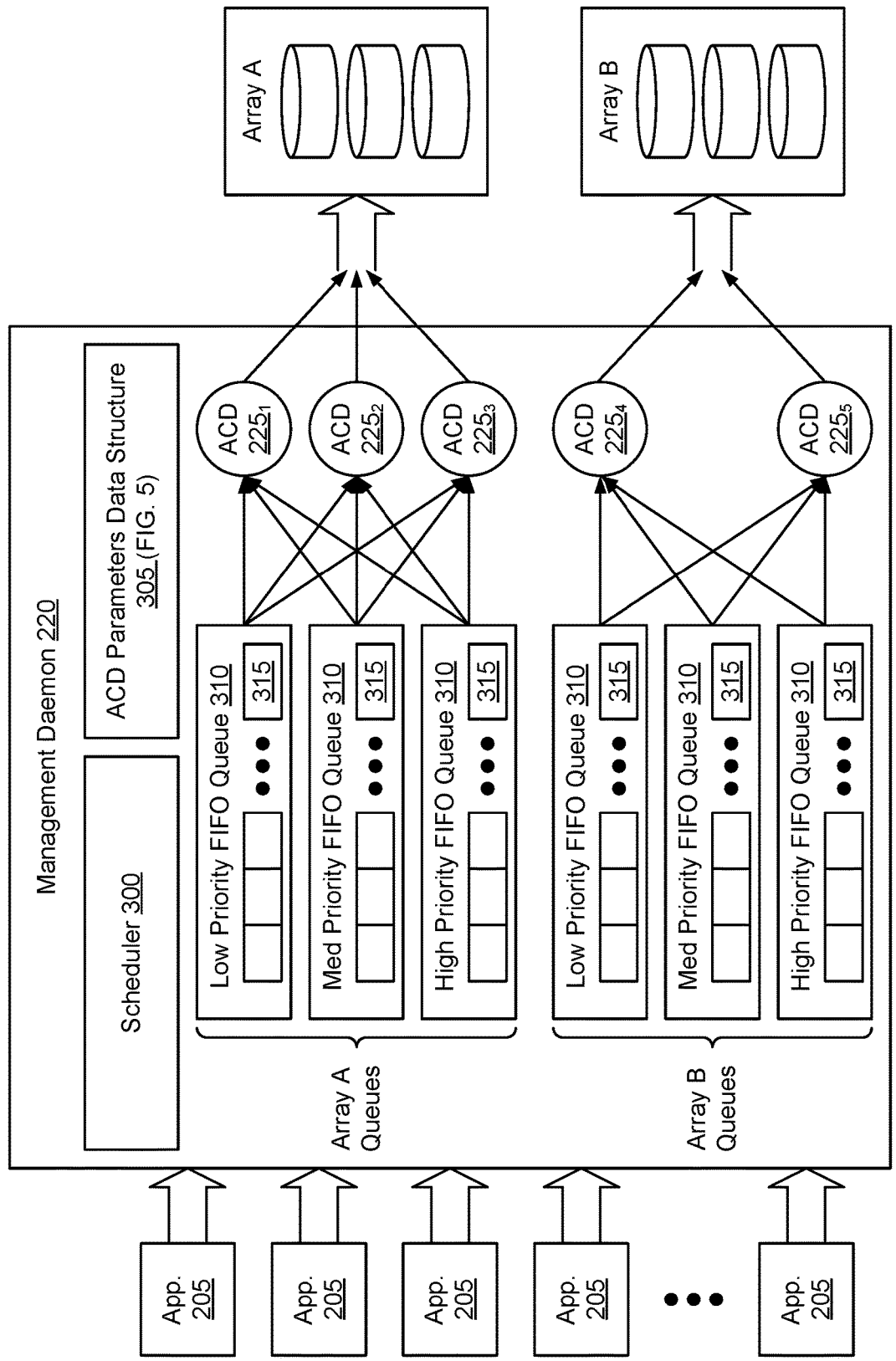
FIG. 3 is a functional block diagram of an example management daemon configured to handle storage system management operations in a storage system such as the storage system of FIG. 1, according to some embodiments.

FIG. 3 is a functional block diagram of an example management daemon configured to handle storage system management operations in a storage system such as the storage system of FIG. 1, according to some embodiments. As shown in FIG. 3, in some embodiments the management daemon 220 has a scheduler and an array control device parameters structure 305.

Applications 205 send syscalls to the management daemon 220 where they are placed into FIFO queues. For example, the management daemon 220 might have low, medium, and high priority FIFO queues 310. In the example shown in FIG. 3, the management daemon 220 is configured to implement syscalls on two arrays (Array A and Array B). Five array control devices 225 are shown in FIG. 3, of which array control devices $225_1$, $225_2$, and $225_3$, are used by the management daemon to implement syscalls on Array A, and array control devices $225_4$ and $225_5$ are used to implement syscalls on Array B. For each target array, a syscall scheduler periodically selects an available array control device to serve a syscall from one of the FIFO queues 310 for that array.

According to some embodiments, multi-protocol array control device management is used to virtualize array control devices, so that different transport protocol end points can be presented as logical array control device $225s$, so that multiple different array control devices can be used as entities to schedule syscall requests which can be sent through different transport technologies. For example, a TCP connection can be presented as a logical array control device to the array control device management daemon, such that syscalls can be sent over the TCP connection to the array. Also, an NVMe device can be used as an array control device 225 to send syscalls to the array.

Figure 4:
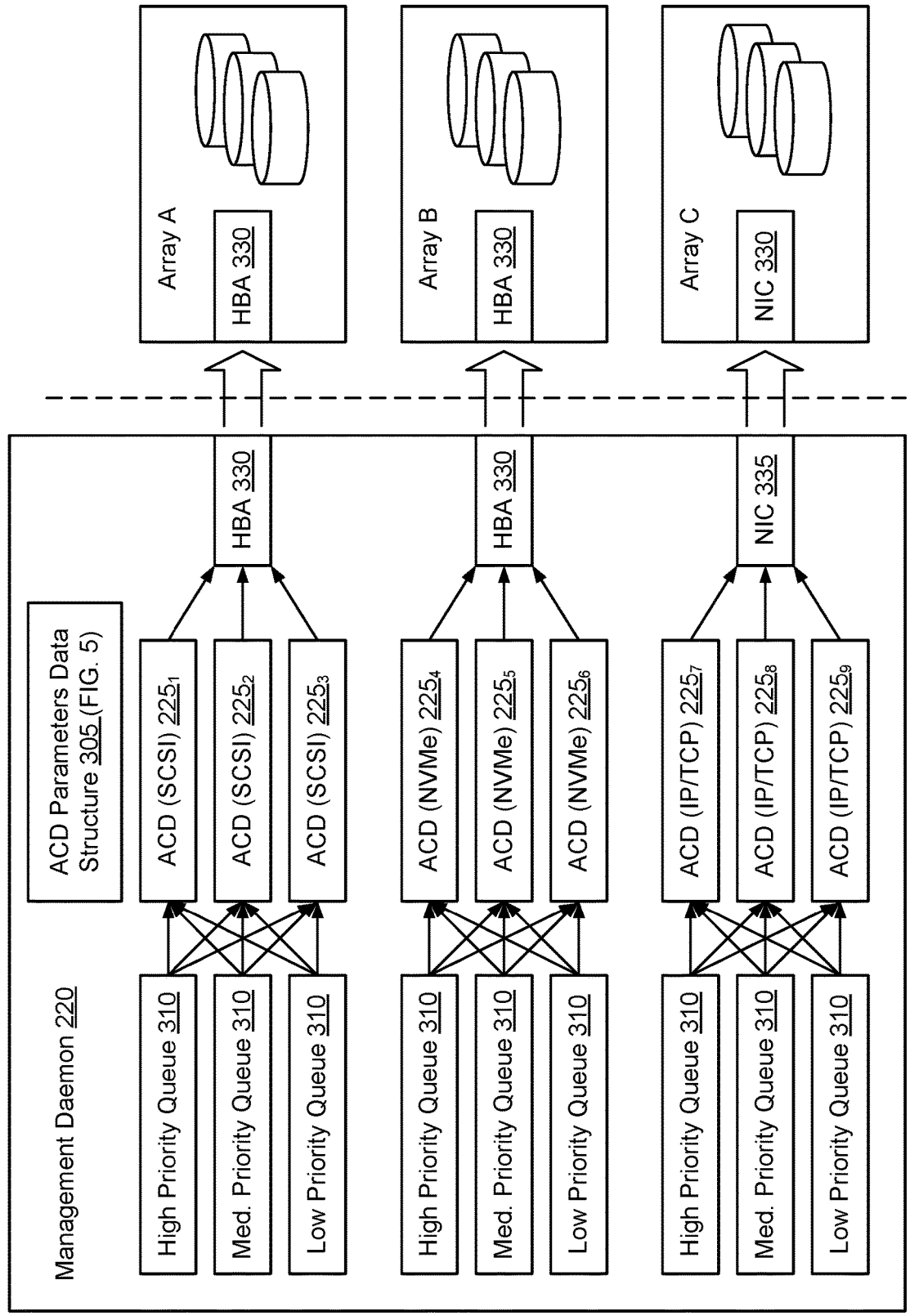
FIG. 4 is a functional block diagram of a management daemon configured to use multiple protocols for array control device access, according to some embodiments.

FIG. 4 is a functional block diagram of a management daemon configured to use multiple protocols for array control device access, according to some embodiments. Specifically, FIG. 4 illustrates several enhancement to array control device management infrastructure to support multiple protocols. Since one storage management host may manage multiple arrays, one or more types of array control devices 225 may coexist on a host. Three types of array control devices 225 are presented in FIG. 4, array control device $225_1$, $225_2$, and $225_3$ are traditional SCSI array control devices 225 to a first array (array A), array control devices $225_4$, $225_5$, and $225_6$ are NVMe array control devices that connect to a second array (array B), and array control devices $225_7$, $225_8$, and $225_9$ are TCP connections presented as logical array control devices to a third array (array C). In general, multiple array control devices 225 are configured for each array as shown in FIG. 4, although additional array control devices can be configured to each array depending on the implementation. Syscalls are sent over corresponding transport links between the management host and the array.

In some embodiments, the management daemon shown in FIG. 4 enables the concept of an array control device to be virtualized, thus making the array control device independent of the underlying transport technologies, so that the array control device is a logical entity for resource scheduling, but not directly associated with any specific transport technology. Additionally, the management daemon is able to implement different types of array control devices, each with a different transport module which is specific to a transport technology. Different transport technologies imply different payload encapsulation, configuration, discovery, and life cycle management, as discussed in greater detail herein. In some embodiments, the array control device properties and statistics are separated into two layers, technology specific and technology generic. This enables the management daemon 220 to provide a unified array control device management interface for all types of array control devices.

Figure 5:
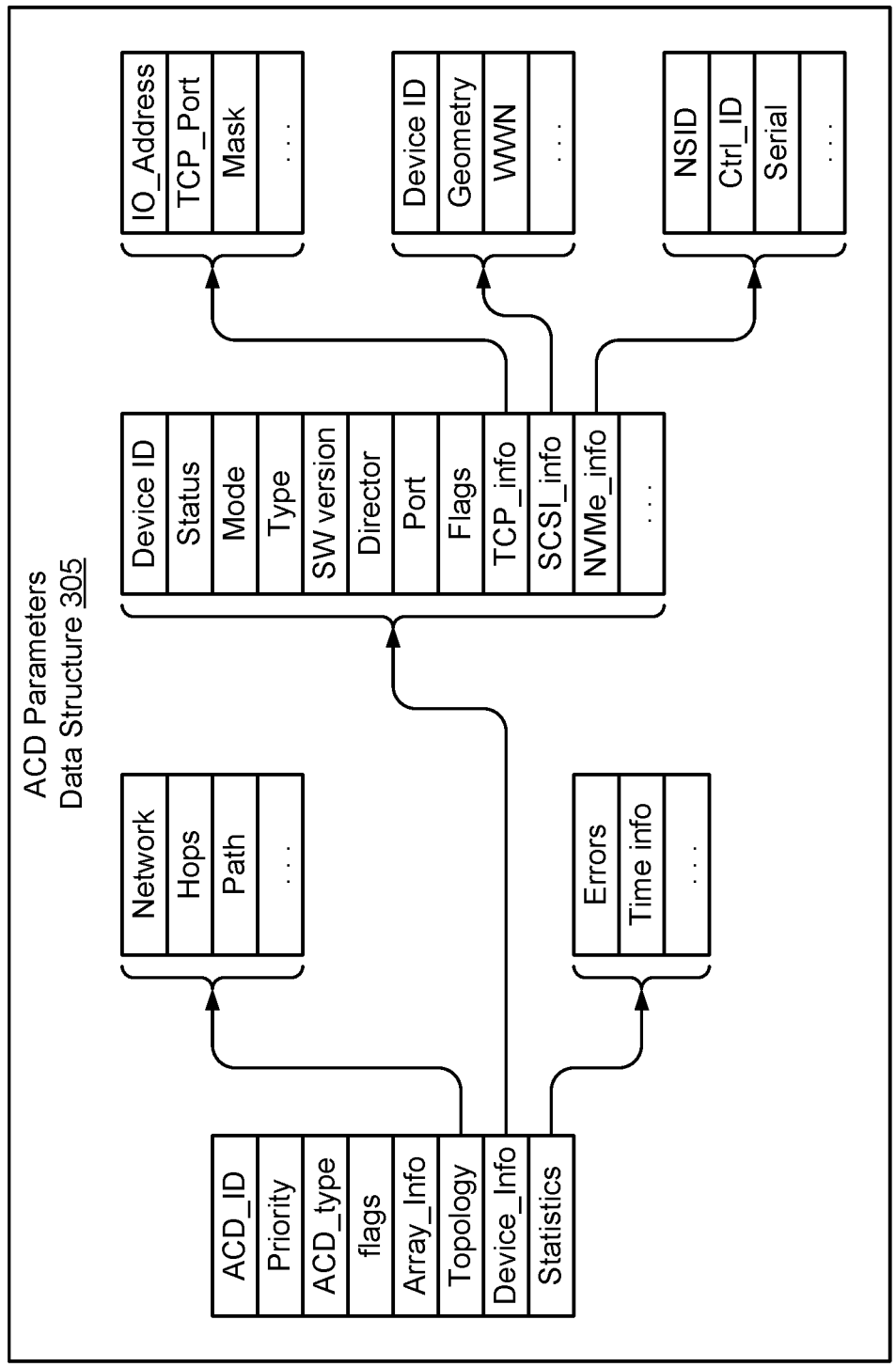
FIG. 5 is a functional block diagram of an example data structure configured to maintain information about a set of array control devices configured on a host, according to some embodiments.

FIG. 5 is a functional block diagram of an example data structure configured to maintain information about a set of array control devices configured on a host, according to some embodiments. In the example data structure shown in FIG. 5, the data structure for array control devices is separated into two parts, a structure for generic properties for the protocol end points, and a structure for transport technology specific information. As shown in FIG. 5, in some embodiments the data structure is configured such that the top-level structure on the left side is generic to all types of array control devices.

The structures shown on the right side of FIG. 5 contain information specific to the underlying transport technology. Thus, for example, if one of the array control devices is a TCP connection implementing a logical array control device, the data structure shown in FIG. 5 includes information about the TCP/IP connection, such as the IP address, the port number, the mask view, and other information required to generate traffic to be sent on the TCP/IP connection. For array control devices implemented as SCSI devices, the data structure 305 includes the device ID, geometry, world-wide name, etc. When a NVMe device is being used as an array control device, the data structure 305 includes the namespace ID (NSID), controller ID, NVMe device serial number, etc.

To enable the management daemon to support a Transport Control Protocol (TCP) connection as a logical array control device, and allow syscalls to be sent/received over the TCP connection, in some embodiments a TCP connection between a control host and an array is presented as a logical array control device to the array control device management daemon. The logical array control device is used as an end point to serialize syscalls. Syscalls are encapsulated in TCP/IP packets and sent over Ethernet interfaces (FIG. 4, Network Interface Card 335). On the receiving side, syscall payloads are decapsulated from TCP/IP packets. In some embodiments, the management daemon is also configured to perform topology discovery through the logical array control devices.

In some embodiments, connection security is provided through standard protocols like OpenSSL between the host and the array. For the sake of simplicity, such a logical array control device is referred to herein as a TCP array control device.

In some embodiments, each TCP array control device is identified by an IP address or a domain name of an array, a TCP port number, a host unique name, and a type of the array control device. A configuration file is created when the management software is installed. An entry is added in the configuration file for each TCP connection created as a logical array control device. Each entry contains an IP address or a domain name of an array, a TCP server port number, a host unique name, an array control device type string and the user for which the TCP connection is created. An example is:

location=10.60.151.204, port=5220, name=Conn1, type=TCPGK, user=GKMGT or location=120000296m1.storage.lab.emc.com, port=5220, name=Conn1, type=TCPGK, user=GKMGT In some embodiments, multiple connections to the same TCP server port can be created as multiple logical array control devices.

Any time a connection changes, the related entry needs to be updated in the configuration file. When a connection is no longer needed, the corresponding entry in the configuration file is removed from the configuration file so that array control device management can remove the corresponding TCP array control device from its memory.

All entries, except duplicate entries or entries with an invalid format, are considered usable and passed to the array control device management daemon as configured logical array control devices. The management daemon 220 adds the configured logical array control devices as entries in the array control device parameters data structure 305. An entry is shown as Usable if the connection to the array can be validated or shown as Failed if the connection cannot be set up or has failed.

The management daemon 220 keeps track of configured TCP array control devices in the array control device parameters data structure 305, and periodically calls each TCP array control device to update the connectivity status of the TCP array control devices. The inquiry process scans the array control device parameters data structure 305, and validates each entry for configuration errors. It also issues syscalls via the connections to get the summary information from the array.

In some embodiments, a configured TCP array control device can also be administratively enabled or disabled by array control device management daemon for debugging or maintenance purposes, depending on the implementation.

Figure 6:
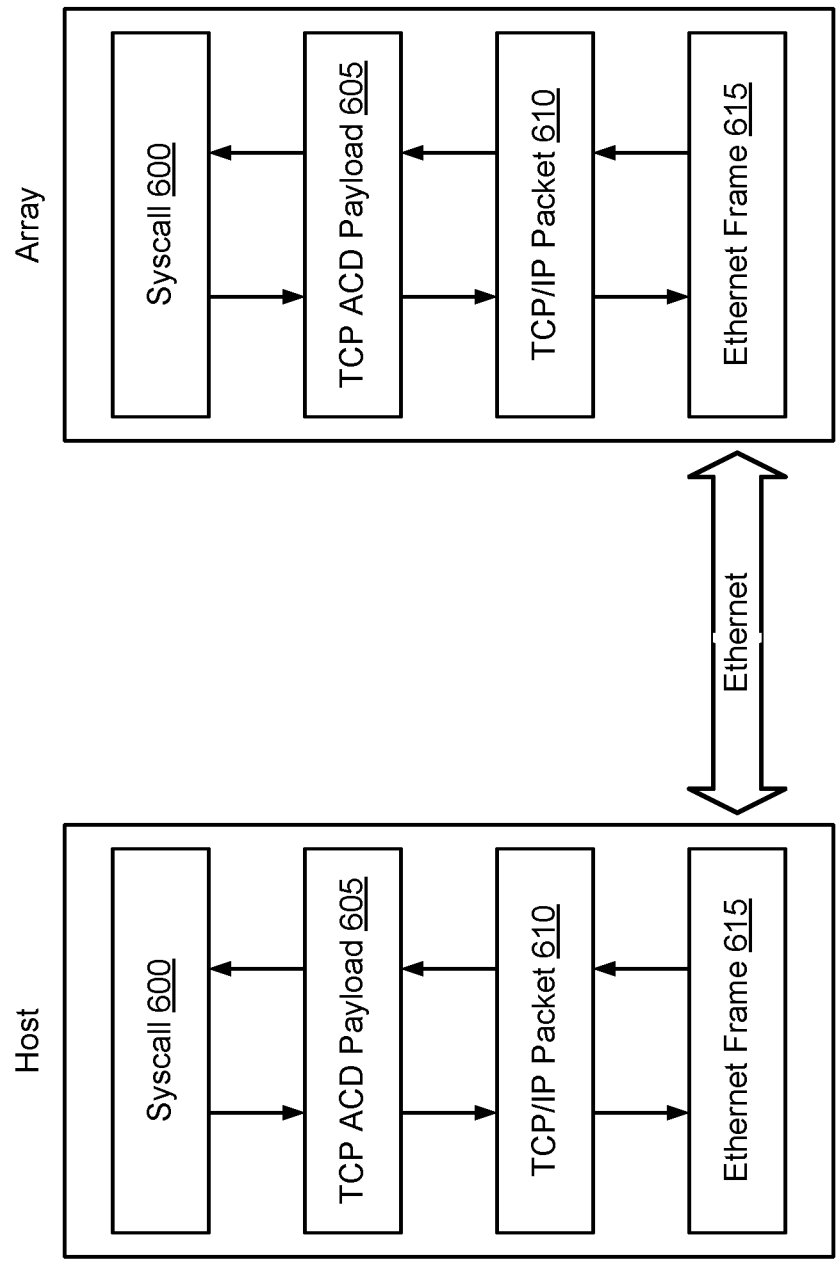
FIG. 6 is a block diagram illustrating example encapsulation of syscalls for management traffic sent through a TCP connection implementing a logical array control device, according to some embodiments.

FIG. 6 is a block diagram illustrating example encapsulation of syscalls for management traffic sent through a TCP connection implementing a logical array control device, according to some embodiments. As shown in FIG. 6, a syscall 600 is first encapsulated in TCP array control device payload 605 by adding a TCP array control device header. An example TCP array control device header is described in connection with FIG. 7. The syscall and TCP array control device header is then put into a TCP/IP packet 610, which is then put into Ethernet frames 615, before sent over an Ethernet network to the array. As shown in FIG. 4, in some embodiments the Ethernet frame is transmitted over Network Interface Card 335 onto an Ethernet network, and is received at a corresponding Network Interface Card 335 at the controlled array. When the syscall result is received from a TCP array control device, its payload is decapsulated by removing the ethernet frame 615 and TCP/IP packet 610, and the TCP array control device header 605 to retrieve the syscall 600. The syscall 600 is then processed on the array.

Figure 7:
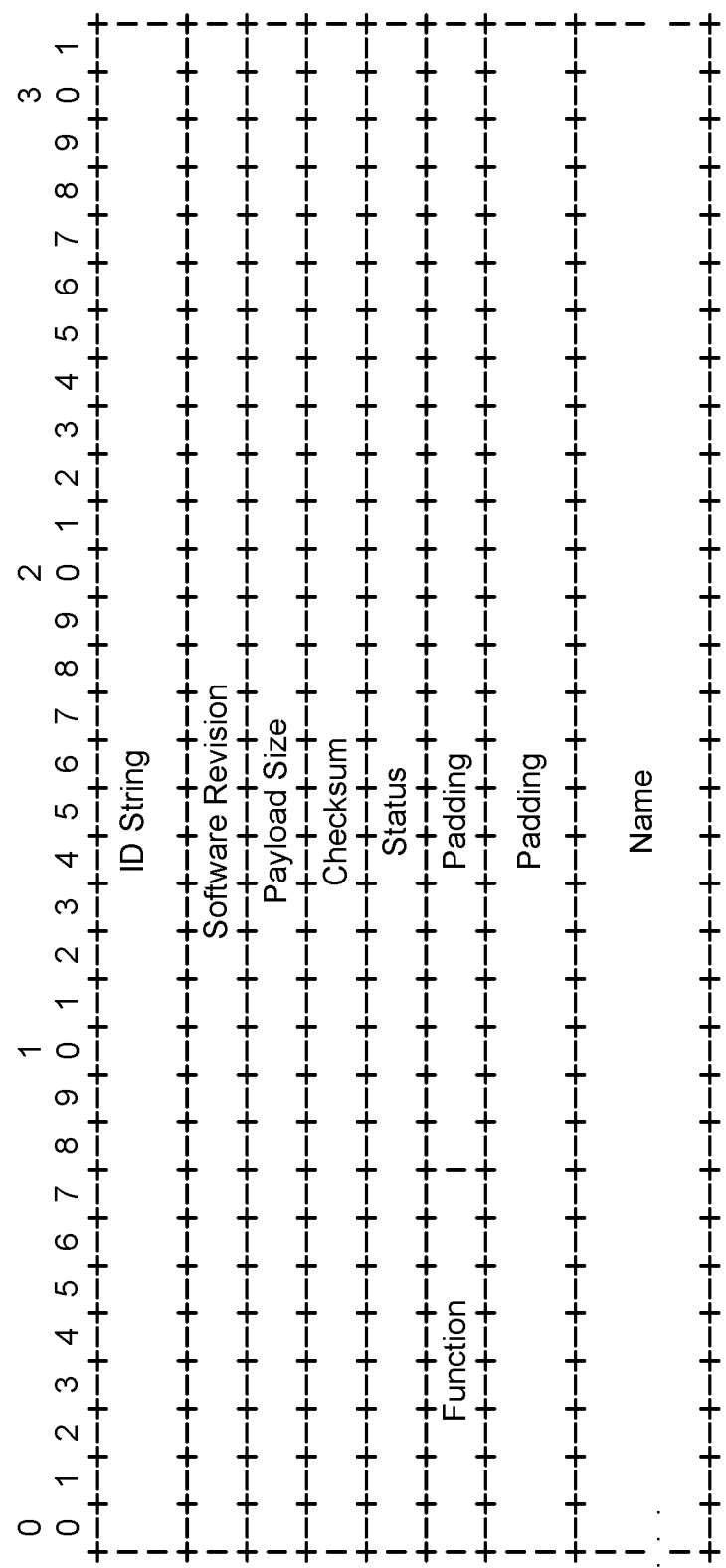
FIG. 7 shows an example format of a TCP array control device header, according to some embodiments.

FIG. 7 shows an example format of a TCP array control device header, according to some embodiments. This header is added for each syscall request and response. FIG. 8 is a table showing the name, length, and meaning of each field in the example TCP array control device header of FIG. 7, according to some embodiments. As shown in FIGS. 7 and 8, in some embodiments the TCP array control device header includes an ID string that identifies the client that issued the syscall, the software revision, a field for the payload size and a checksum that is used to verify the integrity of the payload after transmission to the array or after receipt from the array. In some embodiments the header also includes the status of the syscall, and function field identifying the type of message. The "name" field, in some embodiments, is used to provide a string for the device.

A regular SCSI array control device is not only a target device that clients can write to, but is also used as a data structure that clients use to understand the connectivity of the arrays. Although TCP array control devices are not physical devices, in some embodiments the host management software can obtain reachability information by discovering the topology of arrays through the TCP array control devices.

Multiple logical array control devices may be configured between a control host and an array to provide higher throughput of syscalls, as well as redundancy. Those TCP array control devices are operating over separate TCP connections, either to the same or different server ports, so that the management channel between the control host and the array can survive failure of any individual connections.

In some embodiments, the management daemon 220 is also configured to support use of a Non-Volatile Memory Express (NVMe) devices as an array control devices, and allow syscalls to be sent/received using the NVMe devices over underlying Fibre Channel links (NVMe/FC) or TCP connections (NVMe/TCP). To enable this functionality, in some embodiments an NVMe device is presented as an array control device to the array control device management daemon. The NVMe array control device is used as an end point to serialize syscalls. Syscalls are encapsulated in NVMe admin commands by adding a NVMe administrative header (see FIG. 10) and sent over Fibre Channel links or TCP connections. On the receiving side, syscall payloads are decapsulated from the NVMe admin commands. Additionally, in some embodiments, topology discovery can be carried out through NVMe GKs. For simplicity, array control devices implemented using NVMe devices are referred to herein as a NVMe array control devices.

An NVMe array control device is an NVMe device configured and masked to a host. It is identified by the device name assigned by the host OS. An NVMe array control device is created when the physical device is configured and discovered by the array control device Management Daemon. In some embodiments, a configured NVMe array control device can also be administratively enabled or disabled by array control device management daemon for debugging or maintenance purposes. In some embodiments, multiple NVMe GKs may be configured between a control host and an array to provide higher throughput of syscalls, as well as redundancy.

Figure 9:
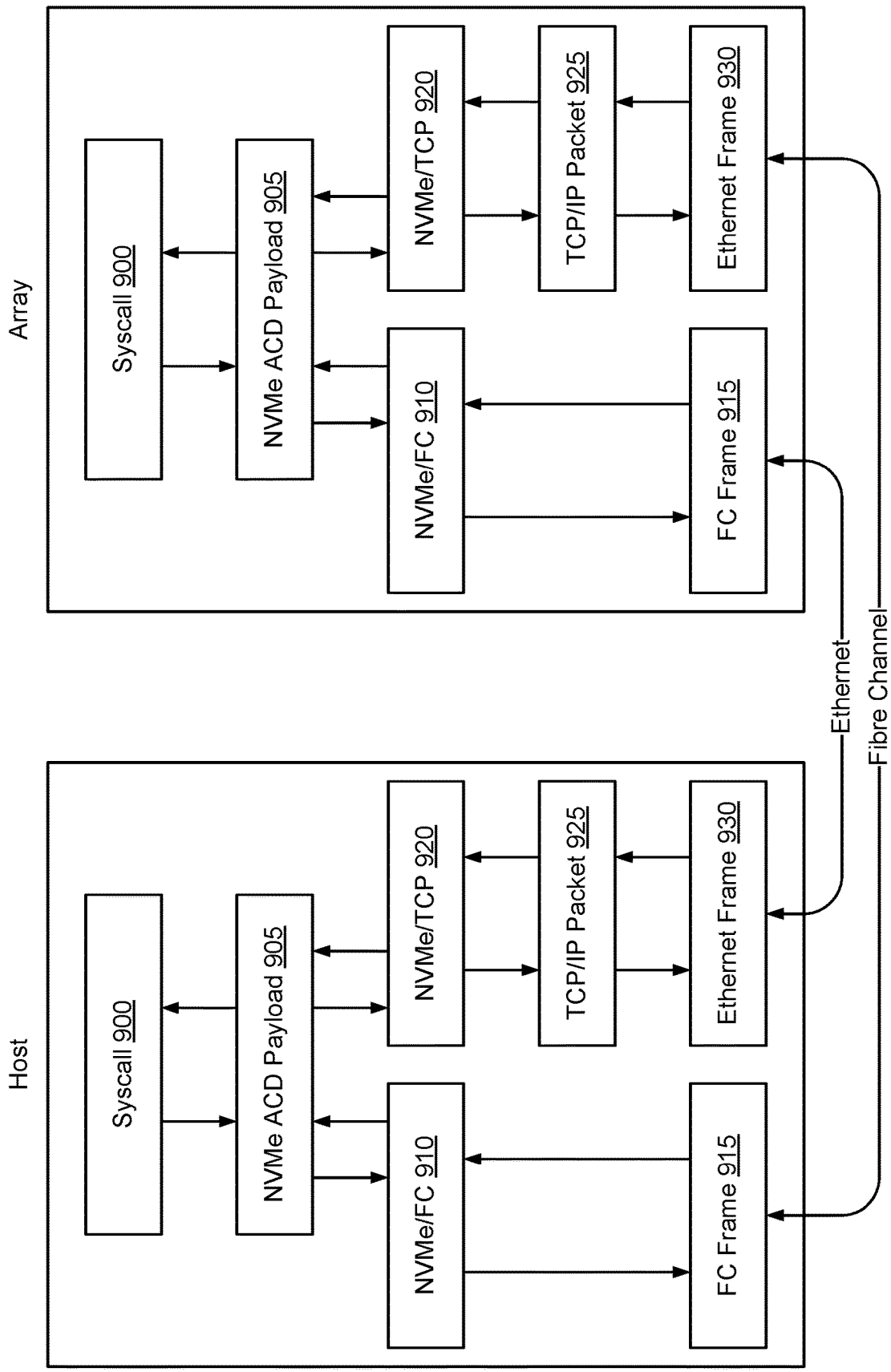
FIG. 9 is a functional block diagram illustrating example encapsulation of syscalls for management traffic sent through NVMe array control devices, according to some embodiments.

FIG. 9 is a functional block diagram illustrating example encapsulation of syscalls for management traffic sent through NVMe array control devices, according to some embodiments. As shown in FIG. 9, a syscall request 900 is first encapsulated by adding a NVMe array control device header to create NVMe array control device payload 905. An example NVMe array control device header is described below in connection with FIG. 10. The syscall 900 and associated header 905 are then encapsulated in an underlying transport protocol frame before sent over to the array. Two underlying transport protocols are illustrated in FIG. 9, NVMe over Fibre Channel and NVMe over TCP.

In the case where Fibre Channel (FC) is the underlying transport protocol, the syscall 900 and associated header (NVMe array control device payload 905) are put into Fibre Channel frames 915 and transmitted over Fibre Channel to the array. When the syscall result is received at the array, the payload is decapsulated by extracting the syscall 900 and associated header 905 from the Fibre Channel frames 915. The NVMe array control device header 905 is then removed to retrieve the syscall 900.

In the case where TCP is the underlying transport protocol, the syscall 900 and associated header 905 are encapsulated in a TCP/IP packet 925, which is put into Ethernet frames 930, before sent over host bus adapter 330 to the array. When the syscall result is received at the host bus adapter at the array, the TCP/IP packet is reconstructed from the ethernet frames 930, and the payload is decapsulated by extracting the syscall 900 and associated header 905 from the TCP/IP packet 925. The NVMe array control device header 905 is then removed to retrieve the syscall 900.

Figure 10:
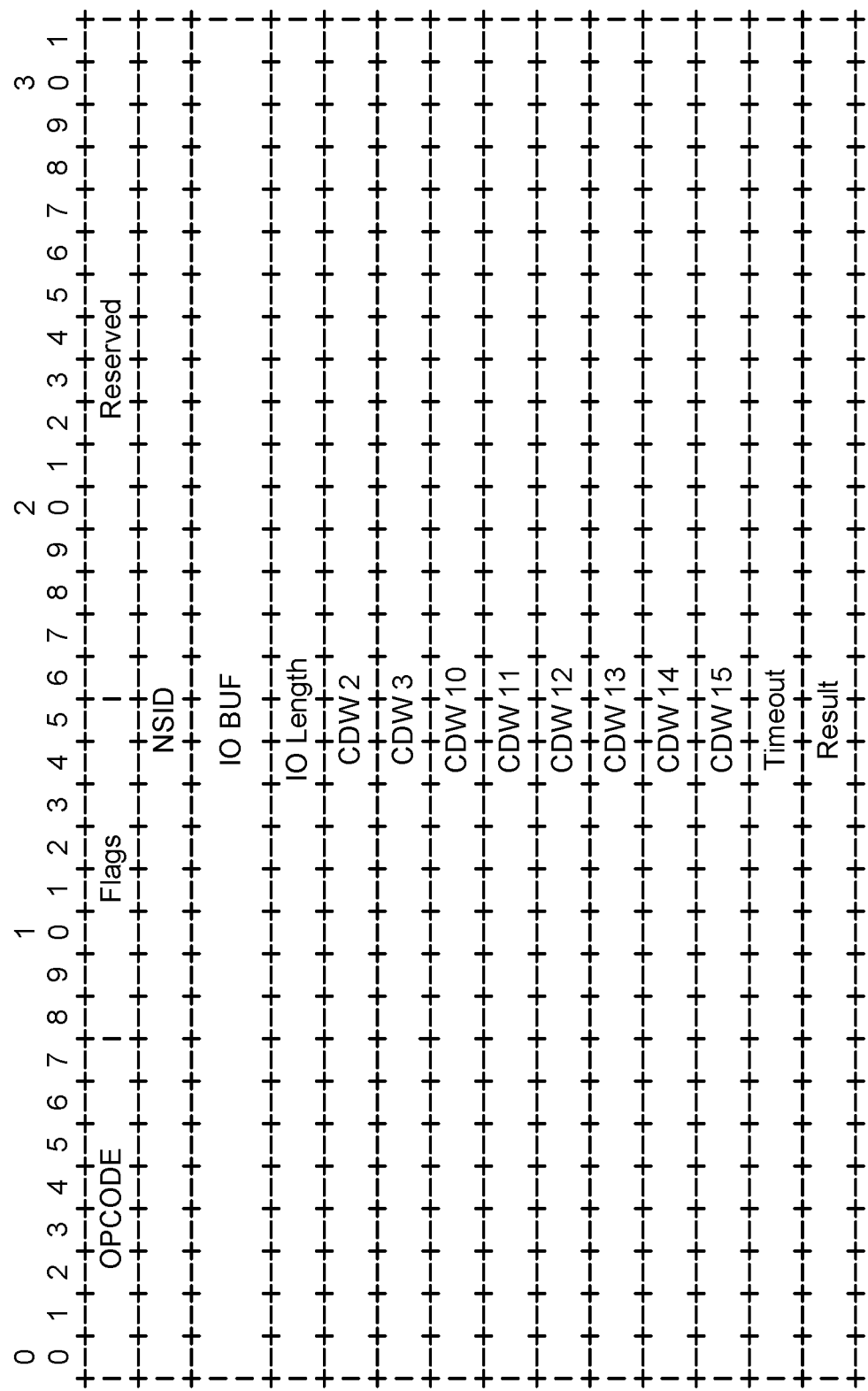
FIG. 10 is a functional block diagram showing an example format of an NVMe array control device header which maps into NVMe admin commands, according to some embodiments, according to some embodiments.

FIG. 10 is a functional block diagram showing an example format of an NVMe array control device header which maps into NVMe admin commands, according to some embodiments. This header complies with the NVMe standard for transmission of administrative commands and is added for each syscall request and response.

FIG. 11 is a table showing the name, length, and meaning of each field in the example NVMe array control device header of FIG. 10, according to some embodiments. As shown in FIG. 11, some of the fields of the NVMe standard were reserved for future use. In some embodiments, as shown in FIGS. 10 and 11, one of the fields that was reserved for future use, the field labeled CDW 12, is used by the management daemon 220 to insert a sequence code that is used for array control device management. The use of the sequence code in field CDW 12 enables multiple syscall operations to be associated with each other. NVMe don't include a notion of atomic operations and, as such, operations that need to be executed in concert need to be correlated using another mechanism. Accordingly, for example, if a syscall intends to write data to an array, and then read the data from the array to ensure that the data was written properly, two separate commands will need to be sent to the array—a first command writing the data, and a second command reading the data. By using a field in the header that carries the sequence code, it is possible to associated multiple operations together, to thereby use two separate syscalls and have the multiple syscalls simulate implementation of atomic operations on the array.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for enabling storage management hosts to use multiple types of array control devices for syscalls in a storage management system, the computer program including a set of instructions which, when executed by a computer, cause the computer to perform a method comprising the steps of:
    configuring a set of array control devices on a management daemon, the set of array control devices including:
        a Non-Volatile Memory Express (NVMe) device implemented as a first array control device on the management daemon and configured to be used by the management daemon to implement syscalls on a first storage system; and
        a Transport Control Protocol/Internet Protocol (TCP/IP) connection implemented as a logical second array control device on the management daemon and configured to be used by the management daemon to implement syscalls on a second storage system;
    receiving a first set of syscalls, by a management daemon to be implemented on the first storage system;
    implementing syscalls of the first set of syscalls, by the management daemon, by encapsulating the syscalls of the first set of syscalls in NVMe administrative commands, and issuing the NVMe administrative commands on the NVMe device;
    receiving a second set of syscalls, by a management daemon to be implemented on the second storage system;
    implementing syscalls of the second set of syscalls, by the management daemon, by encapsulating the syscalls of the second set of syscalls with TCP headers, and transmitting the encapsulated syscalls on the TCP/IP connection to the second storage system.

2. The non-transitory tangible computer readable storage medium of claim 1, wherein the set of array control devices further comprises a Small Computer System Interface (SCSI) device implemented as a third array control device on the management daemon and configured to be used by the management daemon to implement syscalls on a third storage system.

3. The non-transitory tangible computer readable storage medium of claim 2, further comprising receiving a third set of syscalls, by a management daemon to be implemented on the second storage system;
    implementing syscalls of the third set of syscalls, by the management daemon, by issuing the syscalls on the SCSI device.

4. The non-transitory tangible computer readable storage medium of claim 1, further comprising:
    maintaining a first set of syscall queues for the first set of syscalls; and
    maintaining a second set of syscall queues for the second set of syscalls.

5. The non-transitory tangible computer readable storage medium of claim 4, wherein the first set of syscall queues is separate from the second set of syscall queues.

6. The non-transitory tangible computer readable storage medium of claim 4, wherein the first set of syscall queues comprises queues with varying priority values, and the second set of syscall queues also comprises queues with varying priority values.

7. The non-transitory tangible computer readable storage medium of claim 1, further comprising maintaining, by the management daemon, an array control device data structure, the array control device data structure including first parameters for the first array control device and second parameters for the logical second array control device.

8. The non-transitory tangible computer readable storage medium of claim 7, wherein the first parameters comprise a namespace ID (NSID), controller ID, NVMe device serial number for the first array control device.

9. The non-transitory tangible computer readable storage medium of claim 7, wherein the second parameters comprise an IP address, TCP port number, and mask ID for the logical second array control device.

10. The non-transitory tangible computer readable storage medium of claim 1, wherein encapsulating the syscalls of the first set of syscalls in NVMe administrative commands comprises adding an NVMe header to each syscall of the first set of syscalls, each NVMe header including a sequence code for array control device management configured to enabling multiple syscalls of the first set of syscalls to be associated with each other.

11. A method of enabling storage management hosts to use multiple types of array control devices for syscalls in a storage management system, comprising:
    configuring a set of array control devices on a management daemon, the set of array control devices including:
        a Non-Volatile Memory Express (NVMe) device implemented as a first array control device on the management daemon and configured to be used by the management daemon to implement syscalls on a first storage system; and
        a Transport Control Protocol/Internet Protocol (TCP/IP) connection implemented as a logical second array control device on the management daemon and configured to be used by the management daemon to implement syscalls on a second storage system;

receiving a first set of syscalls, by a management daemon to be implemented on the first storage system;

implementing syscalls of the first set of syscalls, by the management daemon, by encapsulating the syscalls of the first set of syscalls in NVMe administrative commands, and issuing the NVMe administrative commands on the NVMe device;

receiving a second set of syscalls, by a management daemon to be implemented on the second storage system;

implementing syscalls of the second set of syscalls, by the management daemon, by encapsulating the syscalls of the second set of syscalls with TCP headers, and transmitting the encapsulated syscalls on the TCP/IP connection to the second storage system.

12. The method of claim 11, wherein the set of array control devices further comprises a Small Computer System Interface (SCSI) device implemented as a third array control device on the management daemon and configured to be used by the management daemon to implement syscalls on a third storage system.

13. The method of claim 12, further comprising receiving a third set of syscalls, by a management daemon to be implemented on the second storage system;

implementing syscalls of the third set of syscalls, by the management daemon, by issuing the syscalls on the SCSI device.

14. The method of claim 11, further comprising:
maintaining a first set of syscall queues for the first set of syscalls; and
maintaining a second set of syscall queues for the second set of syscalls.

15. The method of claim 14, wherein the first set of syscall queues is separate from the second set of syscall queues.

16. The method of claim 14, wherein the first set of syscall queues comprises queues with varying priority values, and the second set of syscall queues also comprises queues with varying priority values.

17. The method of claim 11, further comprising maintaining, by the management daemon, an array control device data structure, the array control device data structure including first parameters for the first array control device and second parameters for the logical second array control device.

18. The method of claim 17, wherein the first parameters comprise a namespace ID (NSID), controller ID, NVMe device serial number for the first array control device.

19. The method of claim 17, wherein the second parameters comprise an IP address, TCP port number, and mask ID for the logical second array control device.

20. The method of claim 11, wherein encapsulating the syscalls of the first set of syscalls in NVMe administrative commands comprises adding an NVMe header to each syscall of the first set of syscalls, each NVMe header including a sequence code for array control device management configured to enabling multiple syscalls of the first set of syscalls to be associated with each other.

* * * * *